(12) United States Patent
Sharma et al.

(10) Patent No.: US 10,402,530 B1
(45) Date of Patent: Sep. 3, 2019

(54) METHOD, SYSTEM, AND COMPUTER PROGRAM PRODUCT FOR IMPLEMENTING PLACEMENT USING ROW TEMPLATES FOR AN ELECTRONIC DESIGN

(71) Applicant: Cadence Design Systems, Inc., San Jose, CA (US)

(72) Inventors: Karun Sharma, San Jose, CA (US); Yu Liu, Pittsburgh, PA (US); Subhashis Mandal, Noida (IN); Kanaka Raju Gorle, Noida (IN); Jeff Taraldson, San Ramon, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 15/396,156

(22) Filed: Dec. 30, 2016

(51) Int. Cl.
*G06F 17/50* (2006.01)

(52) U.S. Cl.
CPC ...... *G06F 17/5072* (2013.01); *G06F 17/5081* (2013.01)

(58) Field of Classification Search
CPC ............ G06F 17/5077; G06F 17/5045; G06F 17/5081; G06F 17/504; G06F 17/5072; G06F 2217/12; G06F 2217/66; G06F 17/30566; G06F 17/5004; G06F 17/5009; G06F 17/505; G06F 17/5054; G06F 17/5068; G06F 16/256; G06F 11/0748; G06F 11/2294; G06F 13/4022; G06F 15/7817; G06F 17/5022; G06F 17/5027; G06F 2217/04; G06F 8/60; G06F 8/65; G06F 8/71; G06F 9/44505; G05B 2219/31466; G05B 2219/45031; H01L 21/67276; H01L 27/0207; H01L 27/092
USPC .................................................. 716/118–125
See application file for complete search history.

(56) References Cited

U.S. PATENT DOCUMENTS

| | | | |
|---|---|---|---|
| 6,209,123 B1 * | 3/2001 | Maziasz | G06F 17/5068 716/123 |
| 6,370,673 B1 | 4/2002 | Hill | |
| 6,557,153 B1 | 4/2003 | Dahl | |
| 6,823,501 B1 * | 11/2004 | Dahl | G06F 9/455 716/122 |
| 7,266,796 B1 * | 9/2007 | Chu | G06F 17/5072 716/123 |
| 7,937,682 B2 | 5/2011 | Arunachalam | |
| 8,448,117 B2 | 5/2013 | Dai | |
| 8,788,998 B2 | 7/2014 | Hatamian | |

(Continued)

OTHER PUBLICATIONS

Final Office Action dated Aug. 8, 2018 for U.S. Appl. No. 15/396,205.

(Continued)

*Primary Examiner* — Binh C Tat
(74) *Attorney, Agent, or Firm* — Vista IP Law Group, LLP

(57) ABSTRACT

Disclosed are techniques for implementing placement using row templates for an electronic design using row templates. These techniques identify or create a row region in a layout of an electronic design. A row template is applied to the row region to create one or more placement rows in the row region. One or more layout circuit components may then be placed into one or more rows or at one or more locations to create a legal placement layout by guiding placement of the one or more layout circuit components with the row template.

20 Claims, 14 Drawing Sheets

(56) References Cited

U.S. PATENT DOCUMENTS

| | | |
|---|---|---|
| 9,465,908 B2 | 10/2016 | Bischoff |
| 9,690,896 B2 | 6/2017 | Seo |
| 9,727,685 B2 | 8/2017 | Yuan |
| 2005/0198605 A1* | 9/2005 | Knol .............. G06F 17/5072 716/124 |
| 2007/0245281 A1* | 10/2007 | Riepe .............. G06F 17/5072 716/102 |
| 2007/0283306 A1 | 12/2007 | Koefferlein |
| 2009/0199142 A1 | 8/2009 | Arunachalam |
| 2009/0271753 A1 | 10/2009 | Quandt |
| 2009/0307640 A1* | 12/2009 | Chapman .......... G06F 17/5045 716/136 |
| 2010/0070942 A1 | 3/2010 | Madurawe |
| 2012/0241986 A1 | 9/2012 | Sherlekar |
| 2013/0042217 A1 | 2/2013 | Heng |
| 2013/0104093 A1 | 4/2013 | Huang |
| 2014/0289695 A1 | 9/2014 | Yoshida |
| 2014/0331198 A1 | 11/2014 | Bischoff |
| 2015/0067616 A1 | 3/2015 | Hsu |
| 2017/0032073 A1 | 2/2017 | Chen |
| 2018/0144082 A1 | 5/2018 | Hanchinal |

OTHER PUBLICATIONS

Final Office Action dated Aug. 30, 2018 for U.S. Appl. No. 15/396,178.

Non-Final Office Action dated Feb. 8, 2018 for U.S. Appl. No. 15/396,205.

Non-Final Office Action dated Mar. 9, 2018 for U.S. Appl. No. 15/396,178.

Notice of Allowance dated Mar. 5, 2019 for U.S. Appl. No. 15/396,205.

Non-Final Office Action dated Jan. 10, 2019 for U.S. Appl. No. 15/396,178.

Non-Final Office Action dated Mar. 12, 2019 for U.S. Appl. No. 15/396,229.

Non-Final Office Action dated Dec. 31, 2018 for U.S. Appl. No. 15/396,229.

Notice of Allowance dated Jun. 7, 2019 for U.S. Appl. No. 15/476,921.

* cited by examiner

METHOD, SYSTEM, AND COMPUTER PROGRAM PRODUCT FOR IMPLEMENTING PLACEMENT USING ROW TEMPLATES FOR AN ELECTRONIC DESIGN

CROSS REFERENCE TO RELATED APPLICATIONS

This application is related to U.S. patent application Ser. No. 15/396,178, entitled "METHOD, SYSTEM, AND COMPUTER PROGRAM PRODUCT FOR IMPLEMENTING GROUP LEGAL PLACEMENT ON ROWS AND GRIDS FOR AN ELECTRONIC DESIGN", U.S. patent application Ser. No. 15/396,229, entitled "METHOD, SYSTEM, AND COMPUTER PROGRAM PRODUCT TO IMPLEMENT SNAPPING FOR AN ELECTRONIC DESIGN", U.S. patent application Ser. No. 15/396,205, entitled "METHOD, SYSTEM, AND COMPUTER PROGRAM PRODUCT FOR IMPLEMENTING LEGAL PLACEMENT WITH CONTEXTUAL AWARENESS FOR AN ELECTRONIC DESIGN". The content of the aforementioned U.S. patent applications are hereby incorporated by reference in their respective entireties for all purposes.

BACKGROUND

Modern integrated circuit designs allow certain specific arrangements of devices (e.g., N-P-P-N or P-N-N-P arrangements of transistors). These devices in these specific arrangements of devices may have different heights, different structures, and/or different spacing values in between. On the other hand, conventional placement tools only allow placement of standard cells having the same height. In addition, conventional approaches require intensive computational resources as well as human efforts to manually arrange devices having different height values during placement. In an example including devices having different height values, a placement tool may iterate through a plurality of processing with extensive inputs and manipulations by a designer to place these devices.

For example, a placement tool may arrange these devices in a certain pattern but to subsequently find that the pattern violates certain rules or requirements and thus does not result in a legal placement layout or floorplan. Examples of such violations may include a determination that the pattern is not permitted by some manufacturing requirements, a device in the pattern being placed in a prohibited orientation or a device being placed in a location that does not align one or more grids (e.g., poly grids for polysilicon gates, fin grids for multi-gate devices, etc.) of the device (e.g., an instance of a cell) with the one or more corresponding grids defined for the placement layout or floorplan. Other examples of such violations may include a device being placed at a location that fails to observe the site definition (e.g., siteDEF), In addition, a device may be placed at a location in one of multiple possible orientations where some or all of these multiple possible orientations lead to legal placement of the device. These multiple legal orientations, when coupled with the aforementioned alignment or positioning requirements, further complicate the placement. For example, a device may be placed in a first orientation at a location that results in illegal placement of the device in the placement layout or floorplan. Nonetheless, the same device may be placed in a second orientation at the same location that results in legal placement of the device. In this example, the illegal placement of the device may be fixed by simply rotating the device. Nonetheless, the alignment and/or positioning of the device, when coupled with the orientation, may cause the placement tool to waste much more computational resources to repeatedly trying different placement options before finally arriving at a legal placement result.

The problems of conventional approaches with requiring intensive computation is further exacerbated when a certain arrangement of devices is repeated in a portion of the placement layout. For example, in integrated circuit designs such as memory cells, a pattern or arrangement of devices may be repeated several times to fill a region in the layout. With the conventional approaches, an error in one pattern or arrangement needs to be fixed multiple times so that the repeated patterns or arrangements are legal.

These problems are further exacerbated in advanced technology nodes (e.g., 14 nm and below) that permit only a limited number of legal track patterns and a number of permissible width values. A legal track pattern includes a plurality of routing tracks that are associated with a permissible combination of width values. For example, the advanced technology nodes may require that a routing track associated with 34 nm width cannot be located immediately adjacent to another routing track associated with a width value of 58 nm or greater. Placement tools thus need to address not only the aforementioned complexities but also conform to the limited number of legal track patterns.

Therefore, there is a need for an improved approach to implement placement to address at least the aforementioned shortfalls of conventional approaches.

SUMMARY

Disclosed are method(s), system(s), and article(s) of manufacture for implementing placement for an electronic design using row templates in various embodiments. It shall be noted that although a row may imply a horizontal object such as in databases, the use of "row" in the present disclosure is not intended only to a horizontal object. Rather, a row may correspond to a horizontal object and/or a vertical object, and that a row template thus may include one or more horizontal or vertical rows. For example, some advance technology nodes may require that each metal layer can have interconnects in only one routing direction, and thus no bends or jogs are permitted on a metal layer. In this example, the rows and hence row templates may apply to layers corresponding to the horizontal routing direction as well as layers corresponding to the vertical routing direction.

Some embodiments are directed to a method for implementing placement for an electronic design using row templates. In these embodiments, a row region may be identified or created in a layout of an electronic design. A row template is applied to the row region to create one or more placement rows in the row region. One or more layout circuit components may then be placed into one or more rows or at one or more locations to create a legal placement layout by guiding placement of the one or more layout circuit components with the row template.

In some of these embodiments, one or more row region characteristics or one or more row template characteristics may be customized or modified. A placement region, a placement or route boundary, and/or reference grids may be identified for the row region. The row region may then be snapped to the reference grids. A row template may be identified from an existing row template; a row template may be created anew; and/or a row template may be modified from an existing row template. A plurality of characteristics can be specified in the row template for the row region.

In addition or in the alternative, it may be determined how to fill the row region when a row region height is greater than a row template height. It may also be determined whether the row region overlaps with another row region in the layout. One or more rows may be created to fill the row region by guiding creation of the one or more rows with the row template. One or more characteristics of the plurality of characteristics may be stored in or may be associated with each placement row of the one or more rows. The one or more rows may be stored as one or more corresponding physical objects or one or more corresponding references in a data structure.

The row region may be modified while maintaining at least one characteristic of the plurality of characteristics without regenerating the one or more rows, and the row region may be stored as a row region object or a row region reference in the data structure or in a different data structure in some embodiments.

In some embodiments, a number of rows, a plurality of characteristics, one or more rail characteristics, and one or more background layers may be determined for the row template. The plurality of characteristics, the one or more rail characteristics, or the one or more background layers may be specified in the row template.

Applying the row template to the row region creates at least one placement row of the one or more rows in the row region. At least some of the plurality of characteristics, the one or more rail characteristics, and/or the one or more background layers may be associated with the at least one placement row created in the row region. The row template may be stored as a logical row template object or a row template reference in a data structure. In some embodiments, at least one characteristic of the plurality of characteristics for the number of rows may be updated or modified.

To place the one or more layout circuit components into the row region, an instance to be placed into the row region and a plurality of instance characteristics of the instance may be identified. The placement command may be invoked to query the one or more rows to obtain query results for the instance. In addition, one or more candidate rows may be identified for the instance at least by comparing at least a first instance characteristic of the plurality of instance characteristics to at least a first characteristic of a plurality of characteristics for the row region specified in the row template. In addition or in the alternative, one or more candidate legal location may be identified for the instance at least by comparing at least a second instance characteristic of the plurality of instance characteristics to at least a second characteristic of the plurality of characteristics for the row region specified in the row template. A legal placement layout may then be generated by inserting the instance in a candidate row or at a candidate legal location.

Some embodiments are directed to a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

More details of various aspects of the methods, systems, or articles of manufacture for implementing placement using row templates for an electronic design using row templates are described below with reference to FIGS. 1-9B.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
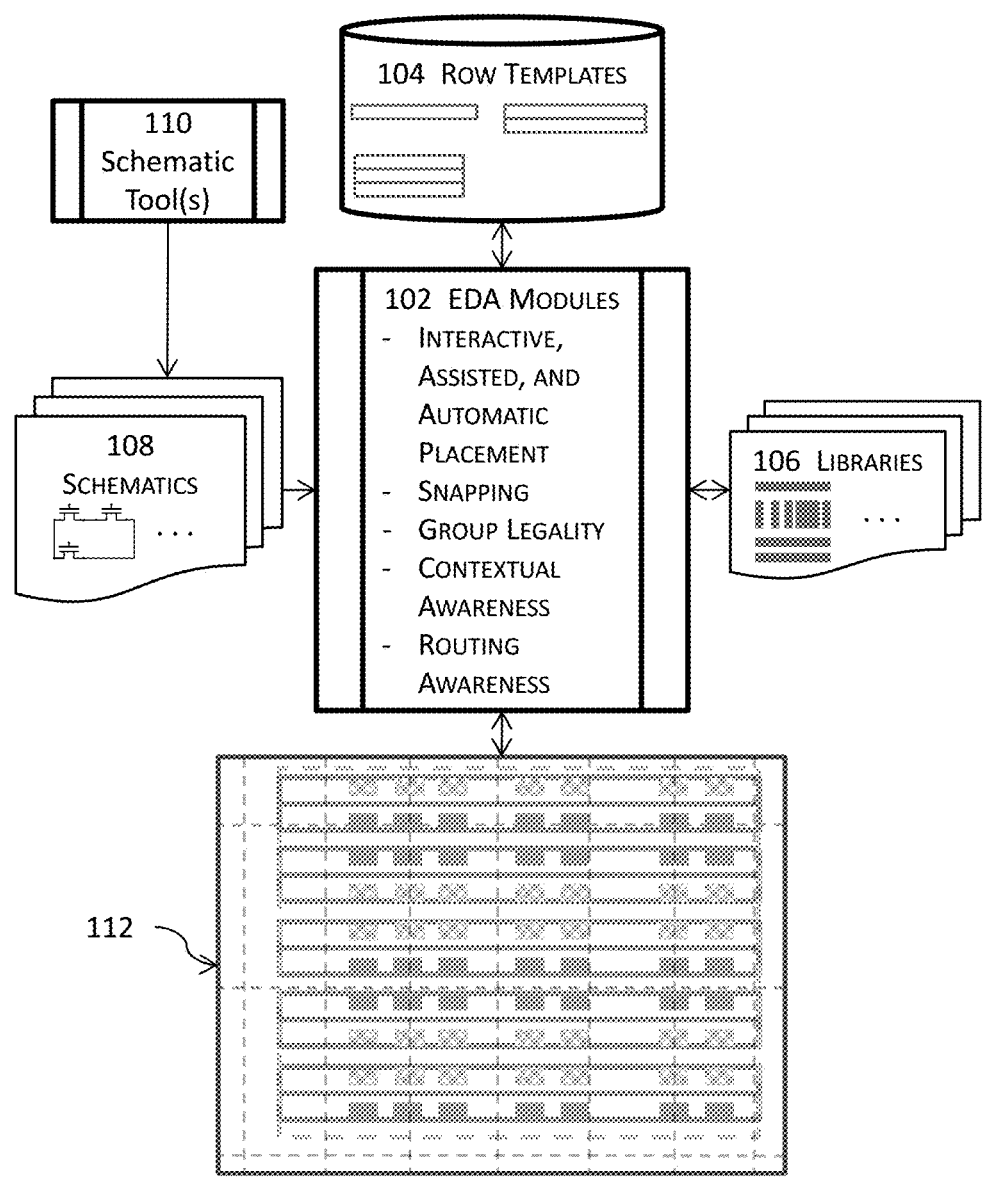
FIG. 1 illustrates a high level block diagram for implementing placement using row templates for an electronic design using row templates in one or more embodiments.

Various embodiments are directed to a method, system, and computer program product for implementing placement using row templates for an electronic design using row templates. Other objects, features, and advantages of the invention are described in the detailed description, figures, and claims.

To address shortcomings of conventional approaches for placing instances of standard cells and custom blocks in a placement layout or floorplan, various embodiments described herein identify a placement region or a place and route boundary in a layout canvas or a floorplan. An object may be created and stored in a data structure (e.g., a database) for the placement region or the place and route boundary as the row region in some embodiments. In some other embodiments, a reference may be created for the placement region or the place and route boundary. A row template, if available, may be identified from a repository of row templates. If the desired or required row template is not available or may not be obtained by modifying from an existing row template, a logical object including specifications of configurations, attributes, or characteristics (collectively characteristics for plural or characteristic for singular) of one or more rows, etc. may be created as the row template. The row template may then be applied to the row region to create one or more rows in the row region and to associate the one or more rows with their corresponding configuration, characteristics, and/or attributes. These configuration, characteristics, and/or attributes associated with a row set forth the requirements for inserting an instance into the row.

Like row templates, one or more objects (e.g., physical objects) or one or more references may be created for these one or more rows and stored in a data structure for subsequent reuse. To place an instance into the placement layout or floorplan, a placement tool may identify the characteristics of the instance and invoke a placement command that queries the one or more row objects or the references to retrieve pertinent information about the configuration, characteristics, and/or attributes of these one or more rows. At least one candidate row may then be identified from the one or more rows in the row region based in part or in whole upon the characteristics of the instance and the configuration, characteristics, and/or attributes of the candidate row. A location in the candidate row may also be determined for the instance in automatic, interactive, as well as assisted placement mode of the placement tool as guided by the row template.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

FIG. 1 illustrates a high level block diagram for implementing placement using row templates for an electronic design using row templates in one or more embodiments. In these embodiments, a plurality of EDA (electronic design automation) modules 102 such as those described with reference to FIG. 9A may be operatively coupled with a data structure 104 storing thereupon a plurality of row templates. Upon receiving a request to create a placement layout, a floorplan, or a portion thereof of an electronic design from, for example, the user interface, these EDA modules 102 may identify the corresponding schematics 108 of the electronic design. The plurality of EDA modules 102 may be further operatively coupled to one or more schematic tools 110 (e.g., a schematic editor, etc.) that may be used to manipulate the corresponding schematics 108.

The plurality of EDA modules 102 may identify a placement region or place and route boundary as a row region, identify one or more row templates from the row template data structure 104, and apply the one or more row templates to the row region to create one or more rows in the row region and to associated respective configurations, characteristics, and/or attributes with these one or more rows. The plurality of EDA modules 102 may then access the libraries 106 of various cells, block, etc. to identify the cells, blocks, etc. and instantiate instances according to the corresponding schematics 108.

Depending on whether the placement is performed in an interactive, assisted, or automatic manner, the plurality of EDA modules 102 may then issue placement commands to query the rows to obtain the row attributes, characteristics, or configurations that are further used to determine the rows into which these instances may be legally inserted; and the plurality of EDA modules 102 may also determine the locations at which these instances may be legally inserted. These instances may then be inserted into their respective rows at their respective locations as guided by the row template to generate the placement layout or floorplan 112.

Figure 2:
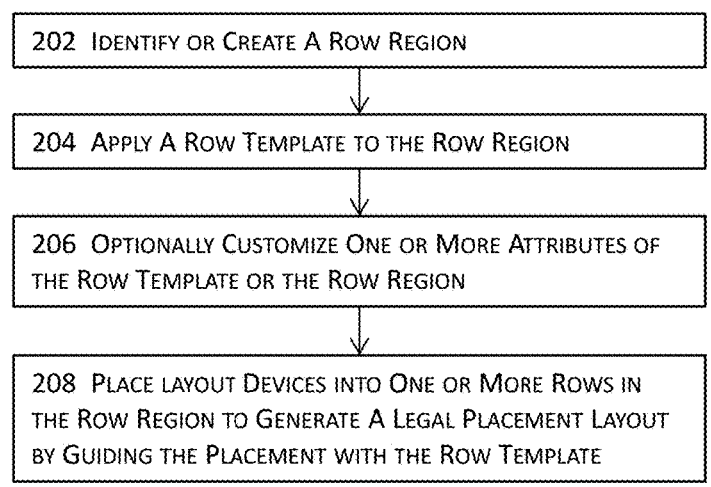
FIG. 2 illustrates a high level flow diagram for implementing placement using row templates for an electronic design using row templates in one or more embodiments.

FIG. 2 illustrates a high level flow diagram for implementing placement using row templates for an electronic design in one or more embodiments. In these embodiments, a row region may be identified or created at 202. A row region may represent a geometric area of the layout or floorplan in the canvas and may be identified in a variety of different manners. For example, a user may specify a placement region or place and route region in a layout canvas or a floorplan, and an EDA module (e.g., a placement module) may create a row region representing the extent of the specified placement region or place and route region. The EDA module may also provide a default region that may be further customized or configured by a designer in some embodiments.

In some embodiments, a row region may be created and stored as an object (e.g., a physical object) that is associated with, for example, its identifier, the extent of the placement region or placement and route region, etc. In some other embodiments, a row region may be created and stored as a reference that is also associated with the same information as does the object. The object or reference of a row region may be stored in a data structure (e.g., a list, a table, a database table, etc.) for subsequent reuse.

A row region may include a rectilinear shape having a plurality of vertices and boundary segments and thus may be stored in various different manners that are not intended to limit the scope of row regions. For example, a row region may be stored as a set of points each corresponding to a vertex of the rectilinear shape. As another example, a rectangular row region may be stored as a reference origin, a length value, and a width value. At this stage (202), a row region may simply be represented as the geometric area in the canvas with no rows created therein or characteristics associated therewith. One or rows may be created at 204 by applying a row template to the row region, and one or more characteristics for each of the one or more rows may be stored in or associated with the one or more rows or the row region itself as described in more details below. More details about row regions are described below with reference to FIG. 3.

A row template may be applied at 204 to the row region. Because row templates may be reused, the row template applied to the row region at 204 may be identified from a repository storing a plurality of row templates in some embodiments. In some other embodiments, the row template applied to the row region at 204 may be modified from an existing row template stored in the repository. Yet in other embodiments, the row template applied to the row region at 204 may be created anew. More details about creating or modifying a row template are described below with reference to FIG. 4.

Applying a row template to a row region creates one or more rows in the row region and associates the one or more rows with their respective characteristics, attributes, or configuration. In some embodiments where a row is created as an object, these characteristics, attributes, or configuration may be stored in the object. In some other embodiments where a row is created as a row reference, these characteristics, attributes, or configuration may be associated with the row reference. These respective characteristics, attributes, or configuration stored in or associated with each row may be subsequently queried by placement commands to determine one or more rows and/or one or more legal locations for placing an instance to create a legal placement layout or floorplan.

One or more attributes, characteristics, or configurations specified in the row template for a row may be optionally customized at 206. Customization may be made to the row template in some embodiments or to individual rows in some other embodiments. The customization to a row template may occur before or after a row template is applied to a row region at 204. In some embodiments where the customization of a row template occurs after the application of the row template to a row region, one or more rows are generated in the row region based on the row template before customization and will thus be re-generated with the customized row template. It shall be noted that regeneration of rows after a row template is customized or modified may apply to all the rows generated with the non-customized row template in some embodiments or only to one or more rows whose attributes, characteristics, or configurations have been affected by the customization in some other embodiments. In some other embodiments where the customization of a row template occurs before the application of the row template to a row region, one or more rows are generated in the row region based on the already customized row template and will not be regenerated.

After the row template is applied to the row region, a placement module may issue one or more placement commands to place one or more instances into their respective rows in the row region at 208 as guided by the row template. As briefly described above, a row may allow one or more specific types of circuit components or devices, and thus an instance of a specific type may not necessarily be inserted into any row in a row region. More details about placing instances into a row region will be described below with reference to FIG. 5. In some embodiments where instances are to be snapped to their respective legal locations in a row region in an automatic, interactive, or assisted placement task, the placement modules may leverage various snapping techniques described in the U.S. patent applications listed in the section entitled Cross Reference to Related Applications.

Figure 3:
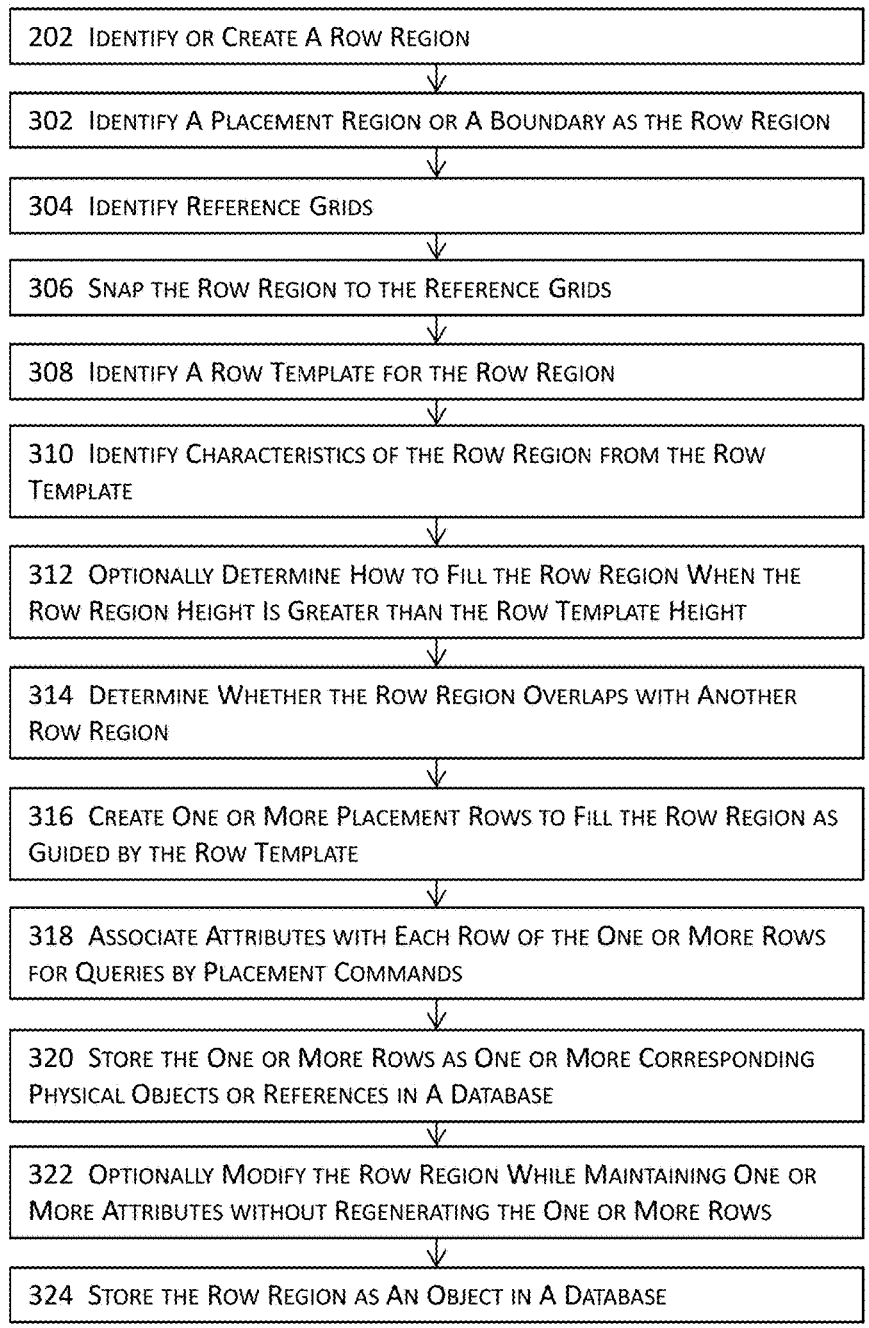
FIG. 3 illustrates more details of a block illustrated in FIG. 2 in some embodiments.

FIG. 3 illustrates more details of a block illustrated in FIG. 2 in some embodiments. More specifically, FIG. 3 illustrates more details about the identification or creation of a row region in the flow diagram illustrated in FIG. 2. A placement region or a place and route boundary may be identified at 302. This placement region or place and route boundary may be identified as the entire placement layout or floorplan, a portion thereof, or an area interactively drawn by a designer with a point device. This placement region or placement and route boundary may be identified as the row region in some embodiments. In some other embodiments where a place and route boundary is identified at 302, a row region may be created as the region within the place and route boundary with one or more offsets from the place and route boundary.

One or more reference grids may be identified at 304. A reference grid may be identified from the manufacturing grids that are often provided by the manufacturers (e.g., a foundry) and consist of both horizontal and vertical grids at a small spacing value (e.g., 1 or 2 nanometers) and may be used to position various entities (e.g., rows, layout circuit component designs, layout devices, cells, blocks, etc.) in a layout. In some embodiments, a reference grid in the horizontal direction (hereinafter reference Y grid) and a reference grid in the vertical direction (hereinafter reference X grid) may be identified at 304.

A reference grid includes a set of parallel reference lines or line segments at a spacing value that is larger than that of the manufacturing grids. An intersection of the reference X and reference Y grids may be identified as the relative origin for the placement region or place and route boundary. The reference X grid and reference Y grid may be independently identified from the manufacturing grids in some embodiments or may be identified from one or more sets of grids that may also be provided by the manufacturers in some other embodiments. For example, an integrated circuit (IC) manufacturer may provide a fin grid for multigate MOSFET (metal-oxide-semiconductor field-effect transistor) such as a FinFET (Fin Field Effect Transistor) or other non-planar or three-dimensional transistors, a poly grid for aligning polysilicon gates, a global fin grid, a global poly grid, etc. in one or both routing directions. The reference X grid and reference Y grid may be identified from one or more of the aforementioned grids in some embodiments.

With the reference grids identified at 304, the row region identified or created at 302 may be automatically snapped to the reference grids at 306. For example, a vertex of the row region (e.g., the lower left vertex of a rectangular row region) may be snapped to the origin of the reference grids or to another intersection between the reference grids. Snapping the row region may or may not alter (e.g., enlarging, shrinking, or changing the shape) the geometries of the row region.

A row template may be identified or created at 308. As described above, the row template may be identified from a repository, modified from an existing row template in the repository, or created anew. More details about identifying or creating a row template are described below with reference to FIG. 4. A plurality of characteristics, attributes, or configurations may be identified at 310 for the row region from the row templated identified or created at 308.

These characteristics, attributes, or configurations may include one or more of, for example, the number of rows in the row template, the reference grids, the positive or negative reference X grid offset, the positive or negative reference Y grid offset, the height of a row in the row template, one or more allowed types of circuit components or devices for a row in the row template, or one or more permissible orientations. These one or more permissible orientations may include, for example, horizontal, vertical, rotating by 0-degree (R0), 90-degree (R90), 180-degree (R180), or 270-degree (R270), mirroring against the reference X grid (MX), mirroring against the reference Y grid (MY), etc. of a circuit component or device when placed in a specific row. It shall be noted that the same circuit component or device may have identical or different orientation(s) when placed in different rows.

In some embodiments, rotation by 90 degrees or 270 degrees may not be permitted in a row region for one or more device types. For example, some advanced technology nodes permit the fins of multi-gate devices (e.g., FinFET) only in the horizontal orientation and the polysilicon grids only in the vertical orientation. In these embodiments, the fin grid will be set up in a row region only in the horizontal routing direction, and the polysilicon grid will be configured only in the vertical routing direction. Moreover, any rows in the row region for placing these one or more device types will not store or will not be associated with the legal orientation of R90 or R270.

In some other embodiments, rotation by 90 or 270 degrees may be permitted in a row region for one or more device types. In these embodiments, pertinent grids (e.g., Fin grids, polysilicon grids, etc.) will be set up in both the horizontal and vertical routing direction for proper snapping or alignment of instances in the row region. Moreover, a permissible row for an instance will now store or will be associated with the legal orientation or R90 and/or R270.

In addition or in the alternative, these characteristics, attributes, or configurations may include one or more of, for example, offset from the reference X grid and/or the reference Y grid for a row in the row template, site definitions (e.g., siteDEF) for instances, alignment references for instances with respect to a row (e.g., aligned to the top, to the bottom, or to the center of the row), positive or negative alignment offsets for instances with respect to a row, instance pitches (for placing instances at multiples of respective instance pitches), etc.

These characteristics, attributes, or configurations may include one or more of, for example, rail attributes including at least one of connectivity information of one or more rails (e.g., Vdd rails, Vcc rails, etc.) for a row, width of a rail, alignment references for one or more rails of a row, positive or negative alignment offsets for one or more rails of a row, etc. These characteristics, attributes, or configurations may include, for example, one or more background layers for a row. More details about background layers are described below with reference to FIG. 7.

A row template may include one or more rows. When a row template is applied to a row region, these one or more rows will be created in the row region. A row region on the other hand, may have a different height than the row template. A determination may be optionally made to decide how to fill the row region with the row template at 312. When applying a row template to a row region, the entire rows or some but not all of the rows in the row template may be created in the row region. In some embodiments where the height of the row region is larger than that of the row template, the row template may be repeated an integral multiple of times to fill the row regions with the rows in the row template with the option of filling the remaining space in the row region, if any, with some but not all of the rows in the row template.

It may also be determined at 314 whether the row region overlaps with another row region. In some embodiments where the row region identified or created at 302 overlaps with another row region already in the layout, the overlapping area may be treated as a logical OR region where instances belong to both row regions may be placed in the logical OR region. In the non-overlapping areas, instances with be placed in their respective row regions. Moreover, in some embodiments where there are coincident rows, the portion of the coincident rows may also be treated as a logical OR row portion, and instances of both regions may be placed in this logical OR row portion.

The row template may then be applied to the row region to create one or more placement rows (or simply rows) to fill the row region at 316 as guided by the row template. As described above, a row template includes the specification of a plurality of configurations, characteristics, or attributes some of which may be pertaining to specific rows in the row template. Because a row may be created as an object or a reference, the plurality of configurations, characteristics, or attributes pertaining to rows may be associated with or stored in the corresponding rows created in the row region at 318. These one or more rows created in the row region may then be stored at 320 as one or more physical objects or references in a data structure such as a list, a table, or a database table for subsequent reuse. These configurations, characteristics, or attributes stored in or associated with rows may be queried by a placement command that determines a legal row or even a legal location for an instance.

Optionally, the row region may be modified at 322 while maintaining one or more attributes, characteristics, or configurations without regenerating any of the one or more rows. For example, a row region may be moved to a different location while the row region module will automatically determines the legal location (e.g., alignment, offsets, etc.) so that the one or more rows created in the row region will not be disturbed. Another modification that may be made to a row region is changing the size or shape of a row region. In some embodiments where the height of a row region is modified, the row template applied to the row region may be optionally applied again to the row region to add or remove one or more rows from the modified row region, depending on whether the height is enlarged or shrunk.

In some embodiments where the length of the row region is changed, the corresponding lengths of the one or more rows created in the row region will also change with respect to the change in the length of the row region. A row region may also be duplicated where the one or more rows created in the original row region will also be automatically created in the duplicated row region. A row region may also be deleted where the one or more rows created in the row region will also be automatically deleted. It shall be noted that a row region may be reused in the same design or in a different design. Therefore, a row region may be identified at 302 by modifying an existing row region object or reference by using the techniques described with reference to 322.

A row region may also be flattened. Flattening a row region effectively alters the hierarchical structure of the layout. In a layout including a row region that further includes one or more rows, the layout may be considered as being located at the highest hierarchy, the row region is located at the hierarchical level immediately below the highest hierarchy, and the one or more rows in the row region are located at the hierarchical level immediately below the hierarchy at which the row region is located. In some embodiments, a row region may be selected from a layout where the one or more rows in the row region may not unless and until an instruction is provided to descend into the row region. Such a descent will render the one or more rows selectable in the layout. In these embodiments, flattening a row region effectively removes the row region from the hierarchical structure and thus renders the one or more rows in the row region selectable from the layout without descending into the row region. The row region may then be stored as an object in some embodiments or a reference in some other embodiments in a data structure at 324 for subsequent reuse.

Figure 4:
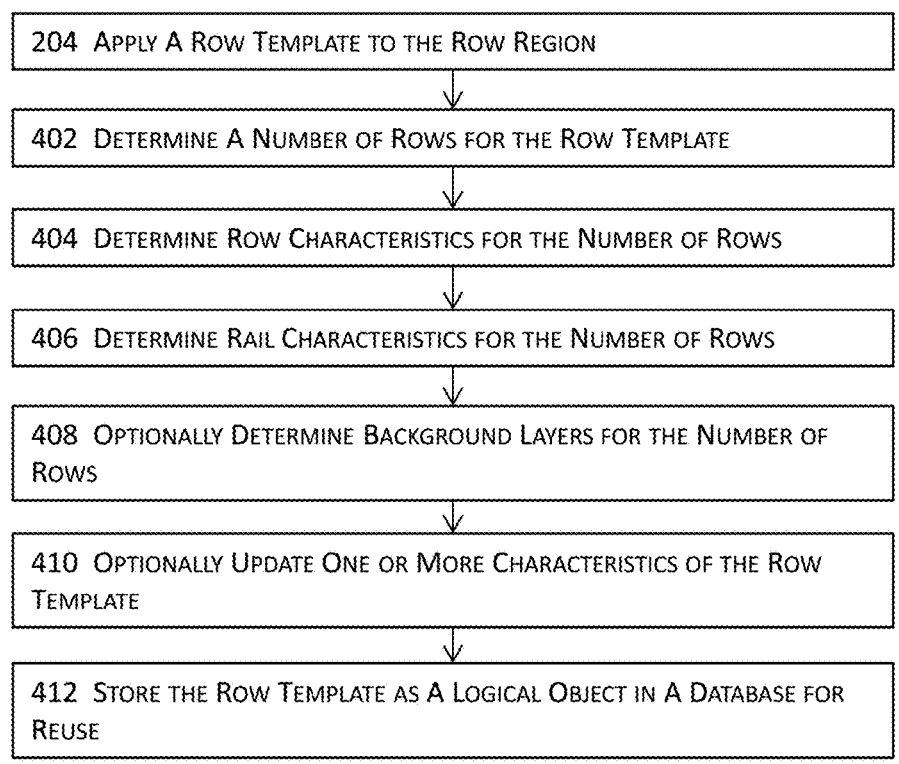
FIG. 4 illustrates more details of a block illustrated in FIG. 2 in some embodiments.

FIG. 4 illustrates more details of a block illustrated in FIG. 2 in some embodiments. More specifically, FIG. 4 illustrates more details about the application of a row template to a row region in the flow diagram illustrated in FIG. 2. Applying a row template to a row region may include the identification (e.g., from existing row templates) or creation (e.g., creating anew or modifying from an existing row template) of the row template to be applied to the row region in some embodiments.

In these embodiments, a number of rows for the row template may be determined at 402; and a plurality of row characteristics, attributes, or configurations, rail attributes, and/or background layers may be respectively determined at 404, 406, and 408 for the number of rows. Some examples of the plurality of row characteristics, attributes, or configurations, rail attributes, and background layers are described above with reference to reference numeral 318 of FIG. 3 although background layers may be entirely optional for a row.

One or more characteristics, attributes, configurations, rail attributes, or background layers determined at 404, 406, and 408 for the row template may be optionally updated or modified at 410. For example, a designer may override one or more of the aforementioned at 410. Like the rows described above with reference to FIG. 3, the row template with the optional update or modification may be stored as a logical object or a reference in a data structure at 412 for subsequent reuse.

Figure 5:
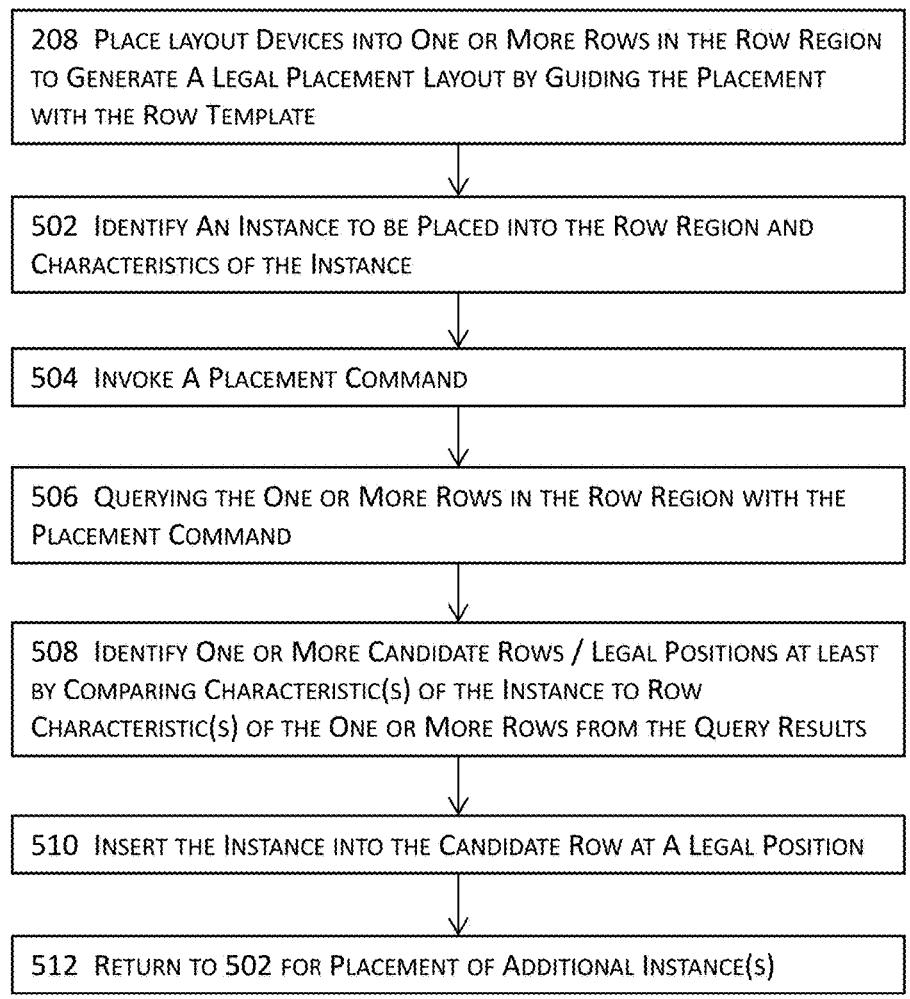
FIG. 5 illustrates more details of a block illustrated in FIG. 2 in some embodiments.

FIG. 5 illustrates more details of a block illustrated in FIG. 2 in some embodiments. More specifically, FIG. 5 illustrates more details about placement of layout devices in the flow diagram illustrated in FIG. 2. In these embodiments, an instance to be placed into the row region may be identified at 502. In addition, one or more instance characteristics of the instance may also be identified at 502. These one or more characteristics may include, for example, the type of the instance (e.g., N-type metal oxide semiconductor or NMOS, P-type metal oxide semiconductor or PMOS, a multigate device, etc.), one or more grids (e.g., poly grids, fin grids, etc.) inside the instance, connectivity information (e.g., identifiers and locations of pins, pads, terminals, etc.), or any other characteristics that may be referenced by a placement module in placing the instance into a layout.

A placement command may be invoked by, for example, an interactive, assisted, or automatic placement module at 504 to place the instance in the layout. When the row template is applied to the row region, one or more rows are created in the row region according to the row template, and characteristics, attributes, or configurations pertaining to these one or more rows are associated with or stored in the corresponding rows. The placement command may then query these characteristics, attributes, or configurations of the one or more rows created in the row region at 506 to obtain relevant information about these one or more rows.

This relevant information in the query results may then be compared with the one or more instance characteristics identified at 502 to identify one or more candidate rows and/or one or more candidate locations at 508. For example, a first row in the row region may allow only NMOS, and the second row may allow only PMOS. In determining a candidate row for placing an NMOS, a placement command may query both the first and second rows to identify the permissible device type characteristic and then select the first row as the candidate row. In some embodiments where more than one candidate row are identified at 508, the placement command may insert the instance into the candidate row or the candidate location that is closest to the instance in an interactive placement mode where a designer may attempt to place the instance by drag an instance into the layout.

A candidate location is a legal location that satisfies one or more design rules so that placing the instance at the candidate location results in a legal placement layout. A candidate location may be determined based in part or in whole upon, for example, one or more grids, alignment requirements, track pattern rules, spacing rules, etc. For example, a legal location may be identified for an instance of a FinFET by identifying the legal location such that the fin grid in the FinFET instance is aligned with the FinFET in a candidate row, and various metal shapes of various widths in the FinFET will be located along their corresponding routing tracks in a legal track pattern in the candidate row.

The placement command may then insert the instance into a candidate row or at a candidate location in a candidate row at 510. The instance is inserted in such a way to satisfy pertinent characteristics, attributes, or configurations. For example, a candidate row may be associated with or may store therein alignment characteristic(s), alignment offset characteristic(s), permissible orientation(s), instance pitch, site definition, or any other characteristics, attributes, or configurations. The placement command may then orient the instance to satisfy the permissible orientation(s) and identify the legal position to satisfy the alignment, offset, instance pitch, or site definition. At 512, the placement module may return to 502 to identify the next instance, if any, for placement into the row region according to the row template.

Figure 6A:
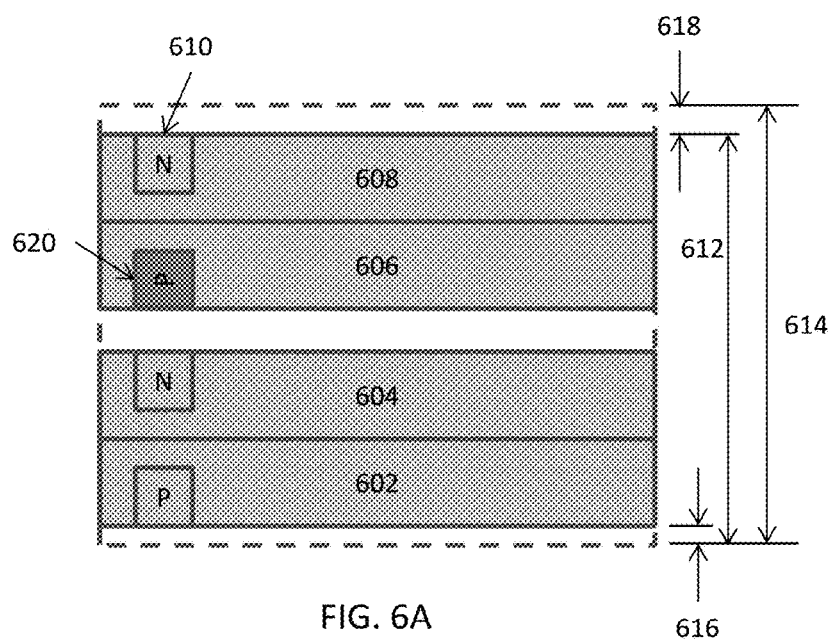
FIG. 6A illustrates a simplified example of a row template in some embodiments.

FIG. 6A illustrates a simplified example of a row template in some embodiments. This simplified example of row template illustrated in FIG. 6A includes four rows—row0 602, row1 604, row2 606, and row3 608—within the template having a template height 614. Row0 is specified in the row template at the row0 offset 616 from the bottom of the row template. This row0 offset 616 may again be used to specify the offset from the top of the row template when this template is repeated in a row region. As graphically indicated in FIG. 6A, each row may store or be associated with a permissible device type, permissible orientation, an alignment characteristic for devices to be placed in the row. In this example illustrated in FIG. 6A, the NMOS (n-type metal-oxide-semiconductor) device 610 in row 608 is shown to be in the permissible orientation of R0 (rotation by zero degree); and the PMOS (p-type metal-oxide-semiconductor)

device 620 in row 606 is shown to be in the permissible orientation of R270 (rotation clock-wise by zero degree).

For example, 610 indicates that only N type devices are allowed to be placed into row3 608 in an R0 orientation (no rotation), and that the devices placed in row3 are to be aligned to the top of the row3 608 as graphically indicated by 610. As another example, 620 indicates that only P type devices are allowed to be placed into row2 606 in an R270 orientation (rotate clockwise by 270 degrees), and that the devices placed in row2 606 are to be aligned to the bottom of the row2 606 as graphically indicated by 620. The row template may also specify individual row offsets from a reference line for the rows in the row template. For example, 616 indicates row0 offset, and 612 indicates row3 offset. The spacing 618 may represent additional spacing requirement between row3 and the next immediately adjacent row as needed by, for example, the permissible devices to be placed into row3 608.

Figure 6B:
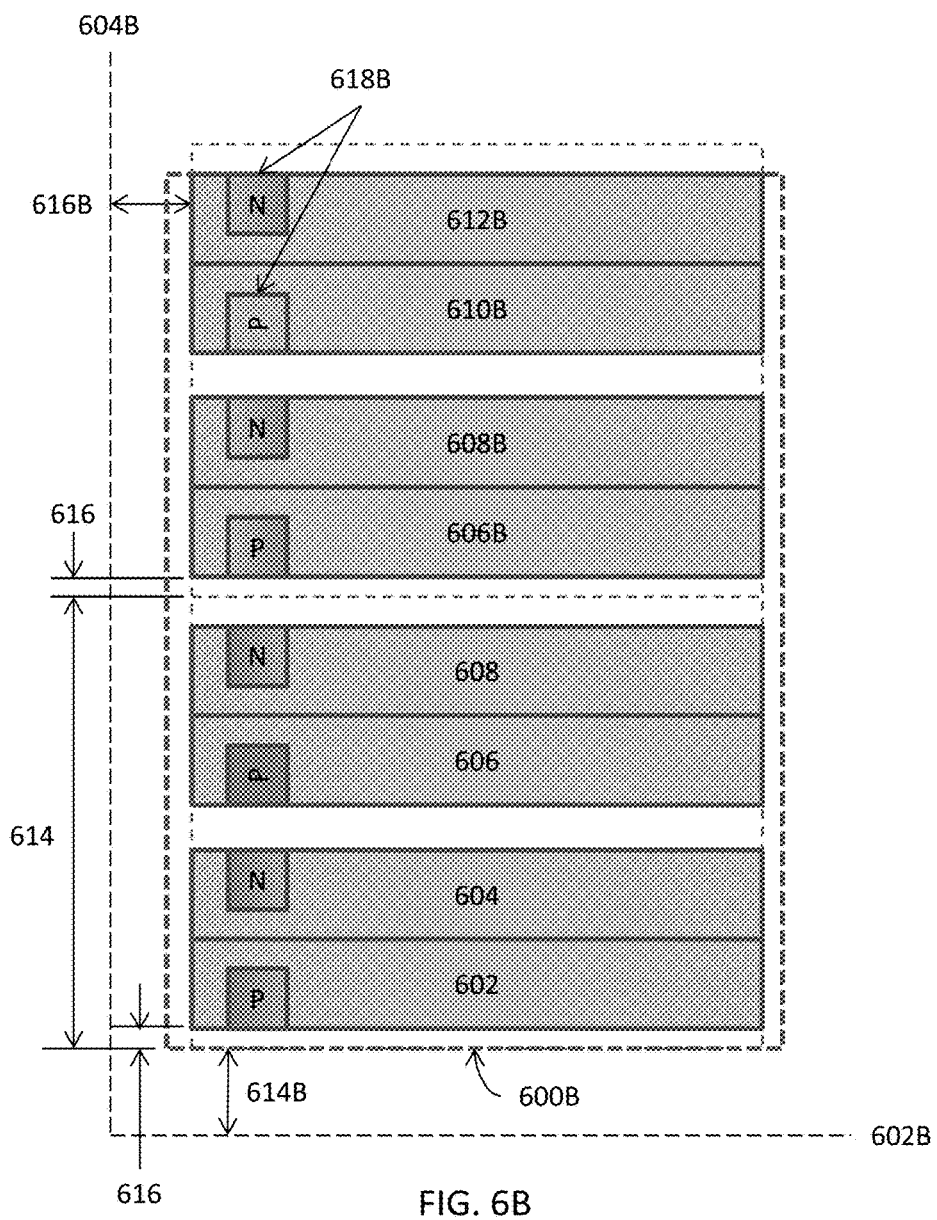
FIG. 6B illustrates an example of applying the row template of FIG. 6A to an example row region in some embodiments.

FIG. 6B illustrates an example of applying the row template of FIG. 6A to an example row region in some embodiments. In this simplified example, the row template in FIG. 6A is applied to a row region 600B that is located in a placement layout with the reference X grid 604B and reference Y grid 602B. The row region is snapped to a location that is defined by the reference Y offset 614B as well as the reference X offset 616B. The height of the row region 600B is greater than that of the row template so the row template is repeated to fill the row region 600B.

When applying the row template to the row region 600B, the first row 602 is created in the row region according to the reference X offset 616B as well as the row0 offset 616. The other three rows 604, 606, and 608 are similarly created in the row region 600B as guided by the row template. When the row template is repeated, the first row 606B is created according to, again, the row0 offset 616 and the reference X offset 616B as shown in FIG. 6B. The row template is repeated so additional rows 608B, 610B, and 612B are created according to the same row template to fill the row region 600B. It shall be noted that the graphical symbols 618B signify the permissible orientation, permissible device type, and alignment characteristics in FIG. 6B and do not represent actual devices placed into these rows.

Figure 6C:
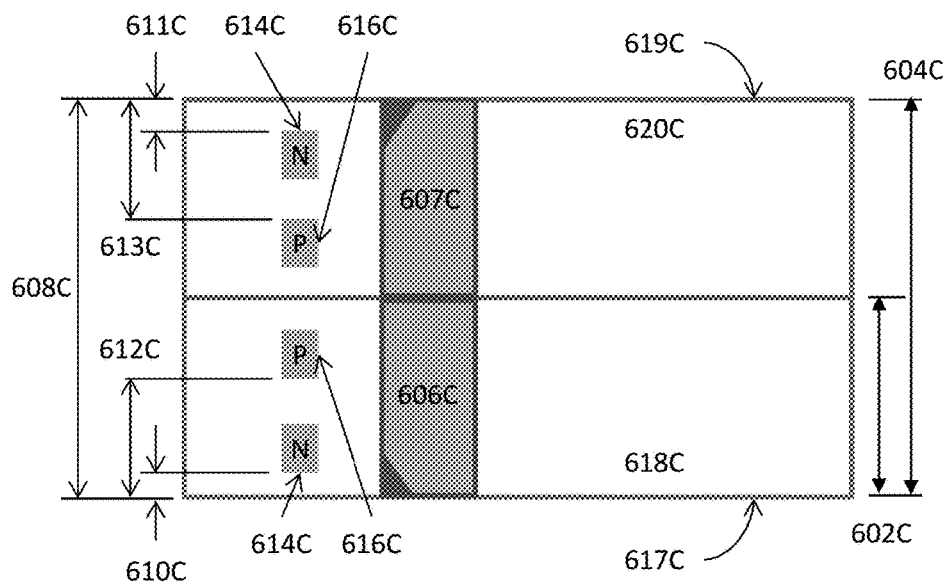
FIG. 6C illustrates another simplified example of a different row template in some embodiments.

FIG. 6C illustrates another simplified example of a different row template in some embodiments. In comparison to the example illustrated in FIG. 6A, this simplified example of a row template illustrated in FIG. 6C represents a mixed mode row template that accommodates both custom devices (e.g., the NMOS 614C and the PMOS 616C) as well as a standard cell of the first type 606C and a standard cell of the second type 607C in two rows—row0 618C and row1 620C.

The row template has a height 608C and specifies the height 602C for both rows. In this simplified example, the row template also specifies the offsets for row0 618C and row1 620C. More specifically, the row0 618C offset is 0 (zero), and the row1 620C offset is 604C. In this example, row0 has a positive row height (positive value of 602C) as measured from the base of row0 618C—the bottom boundary segment 617C of row0 618C. On the other hand, row1 620C has a negative height (negative value 602C) that indicates that row1 620C is mirrored or flipped against the horizontal grid so row1 620C has a base that is represented by the top boundary segment 619C of row1 620C.

The row template also specifies the alignment offsets for the custom devices 614C and 616C as well as the standard cells 606C and 607C. More specifically, 610C represents the alignment offset for the NMOS 614C in row0 618C as measured from the base 617C; and 611C represents the alignment offset for the NMOS 614C in row1 620C as measured from the base 619C. Similarly, 612C represents the alignment offset for the PMOS 616C in row0 618C as measured from the base 617C; and 613C represents the alignment offset for the PMOS 616C in row1 620C as measured from the base 619C.

Figure 6D:
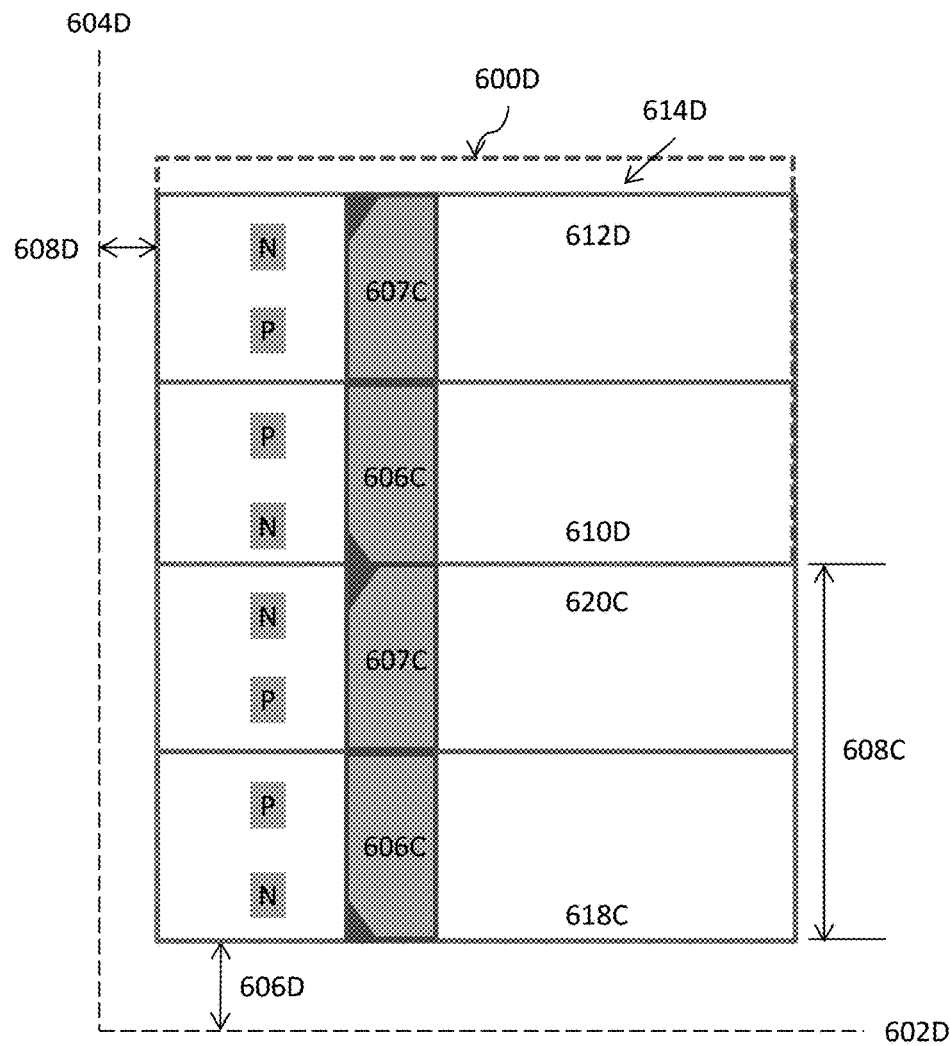
FIG. 6D illustrates an example of applying the different row template of FIG. 6C to another example row region in some embodiments.

FIG. 6D illustrates an example of applying the different row template of FIG. 6C to another example row region in some embodiments. In this simplified example, the row template illustrated in FIG. 6C is applied to row region 600D with the reference Y grid 602D, the reference X grid 604D, the reference Y offset 606D, and the reference X offset 608D. The row region 600D has a height greater than that of the row template. As a result, the row template is repeated to create row2 (610D) and row3 (612D) with some remaining space 614D that is insufficient to create another row according to the row template. It shall be noted that the bottom boundary segment of row2 610D appears to coincide with the top boundary segment of row1 (620D) because, as specified in the row template, the first row (618C and 610D) are to be created with a row0 offset value of zero ("0").

Figure 7:
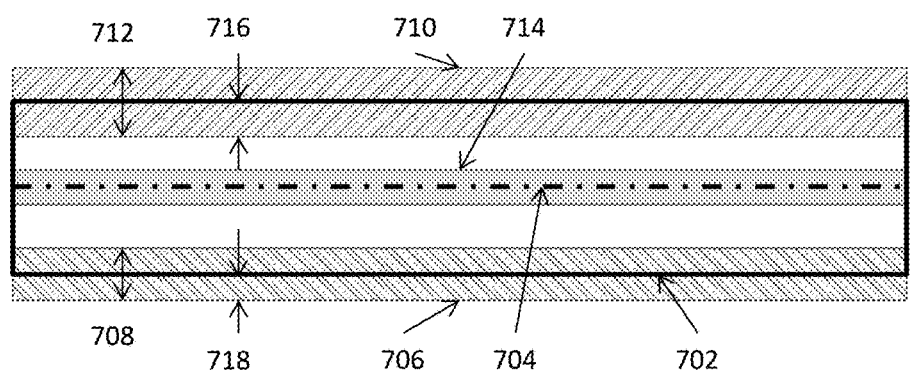
FIG. 7 illustrates a simplified example of a background layer of a row object in some embodiments.

FIG. 7 illustrates a simplified example of a background layer of a row object in some embodiments. A row may include or may be associated with one or more background layers, and the simplified example illustrated in FIG. 7 shows one background layer for a row. A background layer may serve multiple purposes including, for example, various alignment requirements of devices, spacing requirements, etc. For example, some devices share guard-rings (e.g., N-type guard-rings) with N-wells whereas some other devices place p-type guard-rings with at least a minimum spacing between N-wells and the P-type guard-rings. Moreover, well spacing may often be a large number, and tap cells may often be added to modern cells to N-wells (in a P-substrate process) to provide a low resistance connection path to the body and to reduce design complexity of these modern cells. A background may be used to reduce the application and involvement of such extra spacing and/or alignment requirements or rules.

In the simplified example illustrated in FIG. 7, a background layer 702 may be created as an object or a reference for a row and stored in a data structure for subsequent reuse in different regions of the same electronic design or in different designs. The background layer 702 may store or may be associated with one or more attributes or characteristics including, for example, alignment information, spacing information, etc.

For example, the background layer may include alignment information for bottom aligned rail (e.g., Vss) 706 with rail width 708 with the alignment offset 718 from the bottom boundary segment of the background layer. The background layer may also include alignment information for top aligned rail (e.g., Vdd) 710 with rail width 712 with the alignment offset 716 from the top boundary segment of the background layer. The background layer may also include alignment information for center aligned rail 714 with respective to the reference centerline segment 704 of the background layer.

The top, bottom, and center alignment options plus the alignment offsets provides each row with more than three rails illustrated in FIG. 7. For example, the alignment information may also be included for a fourth rail that is to be offset from the top, bottom, or center with a offset value so that a fourth rail with a certain width may be accommodated in the row associated with the background layer.

Figure 8A:
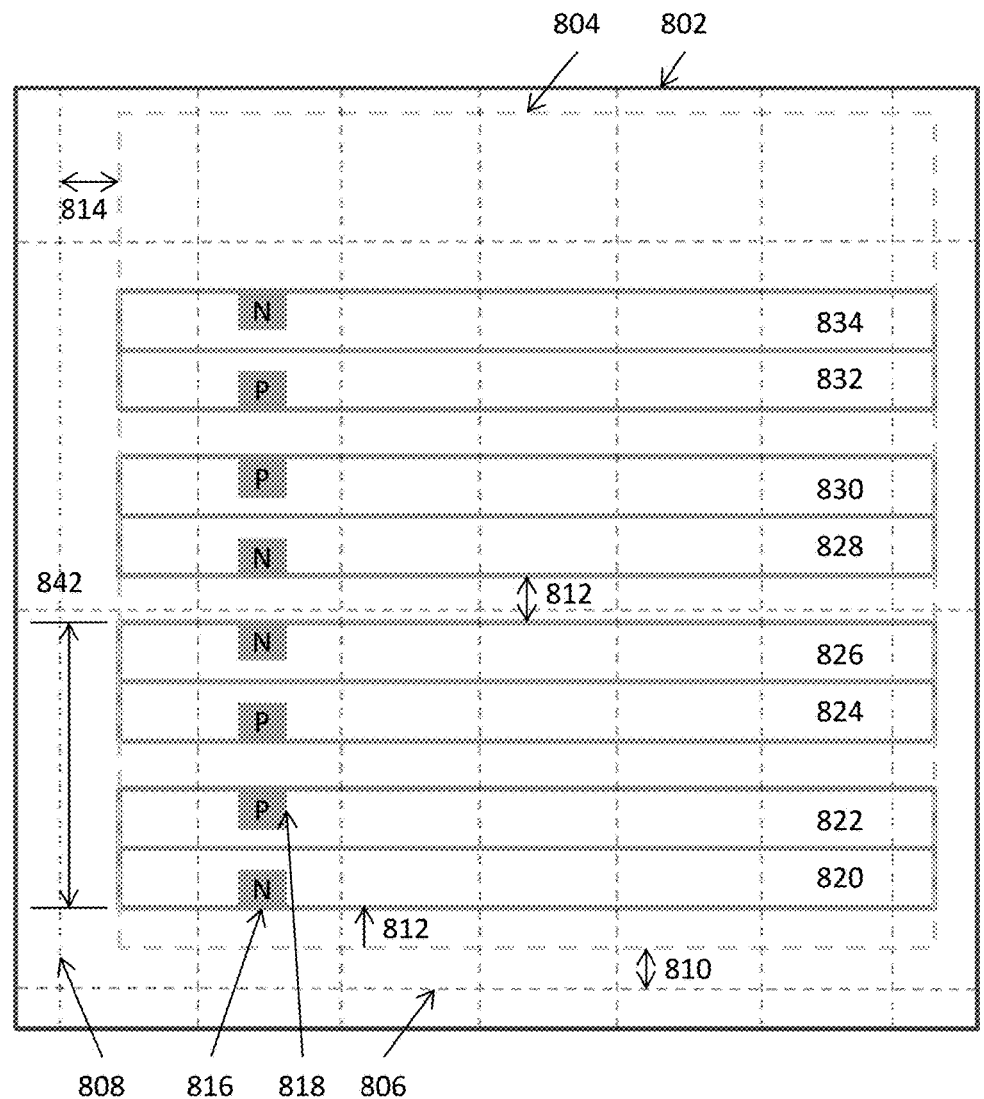
FIG. 8A illustrates a simplified example of creating a plurality of rows in a row region using a row template in some embodiments.

FIG. 8A illustrates a simplified example of creating a plurality of rows in a row region using a row template in some embodiments. More specifically, FIG. 8 illustrates a place and route boundary 802 and a row region 804 created in the place and route boundary 802. The row region is positioned in the layout with the reference X grid 808, the reference Y grid 806, the reference X offset 814, and the reference Y offset 810.

Upon the application of a row template having a row template height 842 and specifying characteristics, attributes, and/or configurations, row0 (820) may be created in the row region 804 with the row0 offset 812 specified in the row template. The remaining row1 (822), row2 (824), and row3 (826) may also be created according to the row template so long as the row region 804 is sufficiently large to accommodate these remaining rows as is shown in FIG. 8A. In this example, row region 804 is sufficiently large not only to accommodate these additional rows (822, 824, and 826) but also to accommodate all the rows (828, 830, 832, and 834) from the repeated application of the row template. The first row (828) in the repeated application of the row template (or the fifth row in the row region) is created with the same row0 offset (812).

It shall be noted that after repeating the application of the row template to the row region 804, there is still remaining space that is sufficiently large to accommodate at least one row (row0) from the row template. Whether this remaining space is to be further filled with a fraction of a row template may be entirely optional or may be determined based in part or in whole upon design requirements. In this example illustrated in FIG. 8A, the NMOS device 816 in row 820 and the PMOS device 818 are shown to be in the permissible orientation of R0 (rotation by zero degree).

Figure 8B:
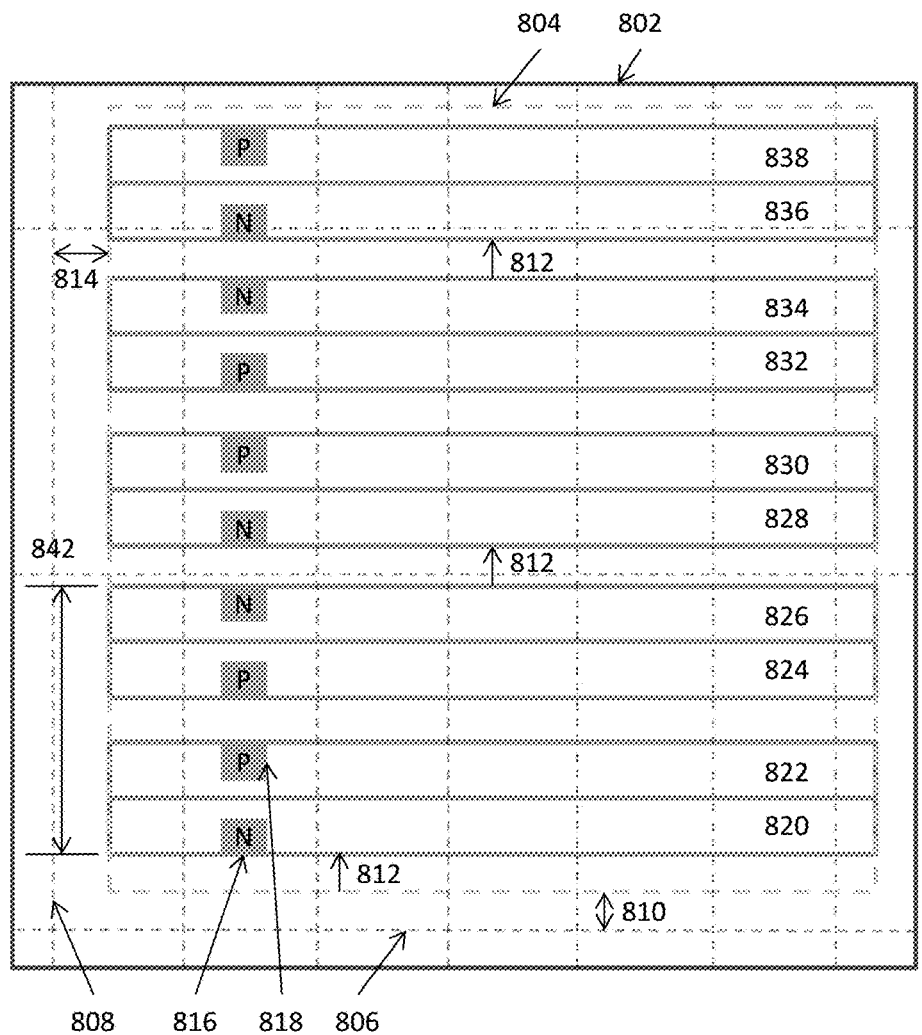
FIG. 8B illustrates another simplified example of creating a plurality of rows in the row region using the row template illustrated in FIG. 8A in some embodiments.

FIG. 8B illustrates another simplified example of creating a plurality of rows in the row region using the row template illustrated in FIG. 8A in some embodiments. Compared to FIG. 8A, the remaining space after repeating the application of row template to create rows 828, 830, 832, and 834 is further filled with a fraction of the row template because the remaining space is not sufficiently large to accommodate all the rows from the row template. In this example, row 836 is created with the row0 offset 812, and row 838 is created immediately adjacent to row 836 as specified in the row template.

Figure 9A:
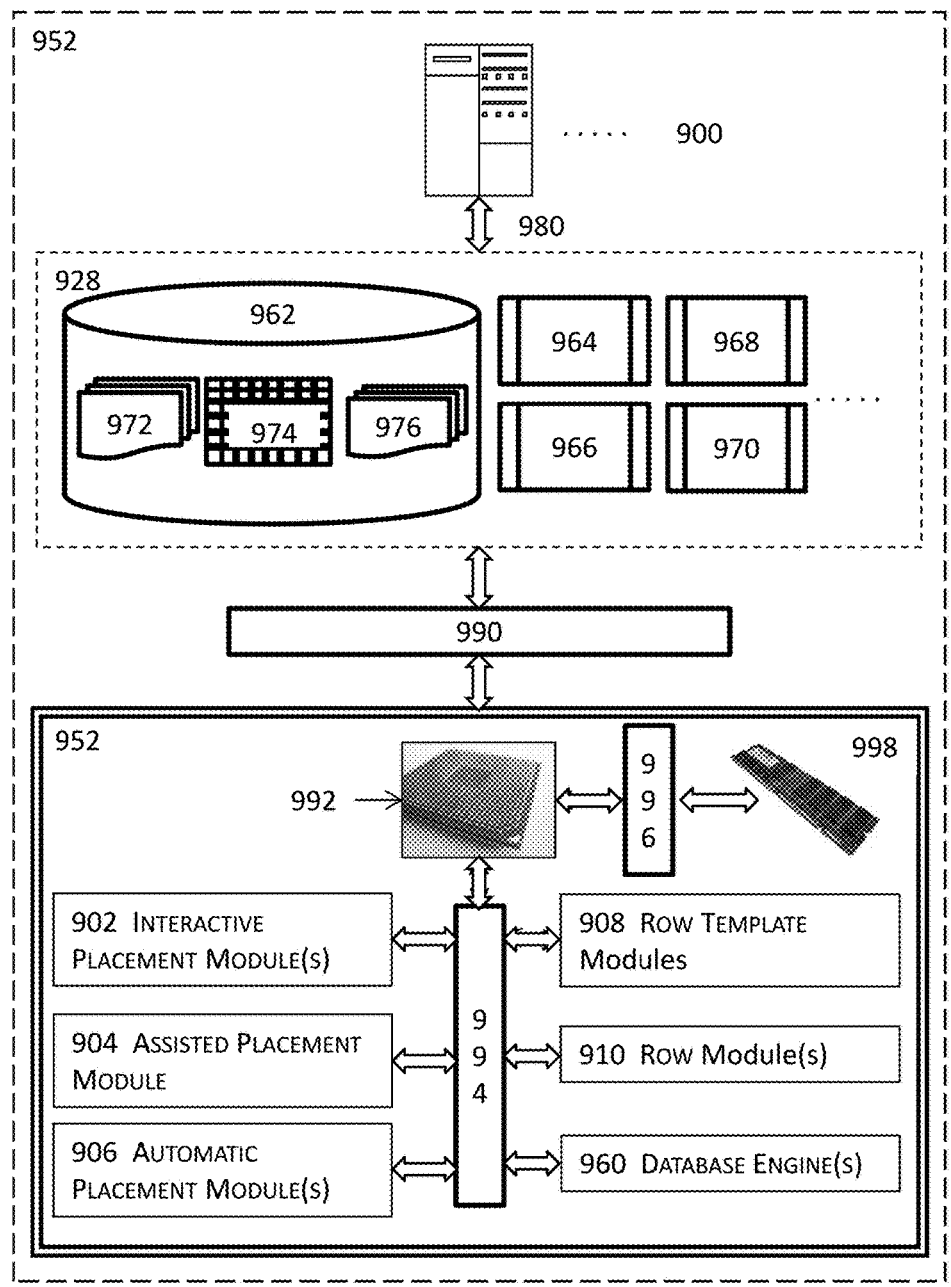
FIG. 9A illustrates a block diagram of a system for implementing placement using row templates for an electronic design using row templates in one or more embodiments.

FIG. 9A illustrates a block diagram of a system for implementing placement using row templates for an electronic design using row templates in one or more embodiments. More specifically, FIG. 9A illustrates an illustrative high level schematic block diagrams for a system for implementing placement using row templates for an electronic design using row templates and may comprise one or more computing systems 900, such as a general purpose computer described in the System Architecture Overview section configured to perform unique functions described herein to achieve one or more special, intended proposes. The illustrative system in FIG. 9A may include an Internet-based computing platform providing a shared pool of configurable computer processing resources (e.g., computer networks, servers, storage, applications, services, etc.) and data to other computers and devices in an ubiquitous, on-demand basis via the Internet. For example, one or more computing resources and/or modules illustrated in FIG. 9A may be located in a cloud computing platform in some embodiments.

In some embodiments, the one or more computing systems 900 may invoke various system resources such as the processor(s) or processor core(s), memory, disks, etc. The one or more computing systems 900 may also initiate or interact with other computing systems to access, via a computer bus architecture (e.g., a system bus, a control bus, a data bus, or any combinations thereof), various resources 928 that may comprise a floorplanner, a global routing engine, and/or a detail routing engine 964, a layout editor 966, a design rule checker 968, a verification engine 970, etc.

The one or more computing systems 900 may further write to and read from a local or remote non-transitory computer accessible storage 962 that stores thereupon data or information such as, but not limited to, one or more databases (974) such as schematic design database(s) or physical design database(s), electronic circuit design specification database(s), various statistics, various data, rule decks, various design rules, constraints, etc. (972), or other information or data (976) that may be used to facilitate the performance of various functions to achieve the intended purposes.

In some embodiments, the one or more computing systems 900 may include or, either directly or indirectly through the various resources 928, invoke a set of modules 952 including hardware modules and software modules or combinations of one or more hardware modules and one or more software modules that may comprise one or more interactive placement modules 902 that interact with a designer in implementing a placement layout or floorplan. For example, a designer may manually define a region and manually drag an instance to a desired location in the manually defined region in a placement layout or floorplan, and an interactive placement module 902 may determine one or more legal positions in one or more rows in a row region based on where the design drags the instance in order to insert the instance to create a legal placement layout or floorplan.

The set of modules 952 may also include one or more assisted placement modules 904 that assist a designer in placing one or more instances in a placement layout or floorplan. For example, a designer may specify a set of instances to be placed in a region in a placement layout or floorplan. An assisted placement module 904 may identify this set of instances and their respective characteristics, identify one or more row templates, apply the one or more row templates to the region, and determine one or more viable placement options for the set of instances. The set of modules 952 may also include an automatic placement module 906 that automatically place the devices of an electronic design or a portion thereof by automatically determining one or more row regions, identifying one or more row templates, applying the one or more row templates to the one or more row regions, and placing the devices or a portion thereof into corresponding rows in the one or more row regions by using the one or more row templates, without human intervention.

The set of modules 952 may also include one or more row template modules 908 to create, modify, and maintain row templates. The set of modules 952 may also include one or more row modules 910 to create row objects or row references for rows, to modify rows, and to maintain rows. In addition or in the alternative, this set of modules 952 may include one or more database engines 960 that function in tandem with one or more other modules (e.g., a row template module, a row module, one or more placement modules, etc.) to perform various database operations such as database queries, etc.

In some embodiments, the computing system 900 may include the various resources 928 such that these various resources may be invoked from within the computing system via a computer bus 980 (e.g., a data bus interfacing a microprocessor 992 and the non-transitory computer accessible storage medium 998 or a system bus 990 between a microprocessor 992 and one or more engines in the various resources 928). In some other embodiments, some or all of these various resources may be located remotely from the computing system 900 such that the computing system may access the some or all of these resources via a computer bus 980 and one or more network components.

The computing system may also include one or more modules in the set of modules 952. One or more modules in the set 952 may include or at least function in tandem with a microprocessor 992 via a computer bus 994 in some embodiments. In these embodiments, a single microprocessor 992 may be included in and thus shared among more than one module even when the computing system 900 includes only one microprocessor 992. A microprocessor 992 may further access some non-transitory memory 998 (e.g., random access memory or RAM) via a system bus 996 to read and/or write data during the microprocessor's execution of processes.

System Architecture Overview

Figure 9B:
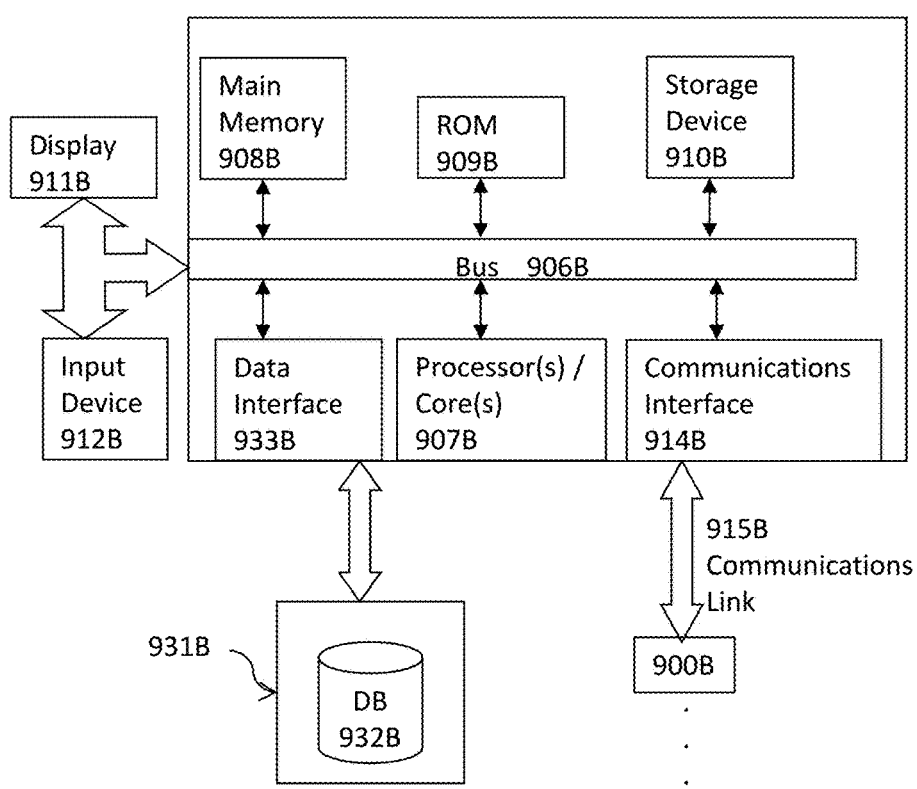
FIG. 9B illustrates a computerized system on which a method for implementing placement using row templates for an electronic design using row templates may be implemented.

FIG. 9B illustrates a computerized system on which a method for implementing placement using row templates for an electronic design using row templates may be implemented. as described in the preceding paragraphs with reference to various figures. The illustrative computing system 900B may include an Internet-based computing platform providing a shared pool of configurable computer processing resources (e.g., computer networks, servers, storage, applications, services, etc.) and data to other computers and devices in an ubiquitous, on-demand basis via the Internet. For example, the computing system 900B may include or may be a part of a cloud computing platform in some embodiments. Computer system 900B includes a bus 906B or other communication module for communicating information, which interconnects subsystems and devices, such as processor 907B, system memory 908B (e.g., RAM), static storage device 909B (e.g., ROM), disk drive 910B (e.g., magnetic or optical), communication interface 914B (e.g., modem or Ethernet card), display 911B (e.g., CRT or LCD), input device 912B (e.g., keyboard), and cursor control (not shown).

According to one embodiment, computing system 900B performs specific operations by one or more processor or processor cores 907B executing one or more sequences of one or more instructions contained in system memory 908B. Such instructions may be read into system memory 908B from another computer readable/usable storage medium, such as static storage device 909B or disk drive 910B. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 907B, where the one or more processors, one or more processor cores, or combination thereof executes one or more threads. For example, various acts of identifying, various acts of determining, various acts of classifying, various acts of implementing, various acts of performing, various acts of transforming, various acts of decomposing, various acts of updating, various acts of presenting, various acts of modifying, etc. may be performed by one or more processors, one or more processor cores, or combination thereof.

A modules described herein may also be implemented as a pure hardware module (e.g., a block of electronic circuit components, electrical circuitry, etc.) or a combination of a hardware module and a software block that jointly perform various tasks to achieve various functions or purposes described herein or equivalents thereof. For example, a module described herein may be implemented as an application-specific integrated circuit (ASIC) in some embodiments.

In these embodiments, a module may thus include, for example, a microprocessor or a processor core and other supportive electrical circuitry to perform specific functions which may be coded as software or hard coded as a part of an application-specific integrated circuit, ROM (read only memory), PROM (programmable read only memory), EPROM (erasable programmable read only memory), etc. despite the fact that these microprocessor, processor core, and electrical circuitry may nevertheless be shared among a plurality of module. A module described herein or an equivalent thereof may perform its respective functions alone or in conjunction with one or more other modules. A module described herein or an equivalent thereof may thus invoke one or more other modules by, for example, issuing one or more commands or function calls. The invocation of one or more other modules may be fully automated or may involve one or more user inputs.

The term "computer readable storage medium" or "computer usable storage medium" as used herein refers to any non-transitory medium that participates in providing instructions to processor 907B for execution. Such a medium may take many forms, including but not limited to, non-volatile media and volatile media. Non-volatile media includes, for example, optical or magnetic disks, such as disk drive 910B. Volatile media includes dynamic memory, such as system memory 908B. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 900B. According to other embodiments of the invention, two or more computer systems 900B coupled by communication link 915B (e.g., LAN, PTSN, or wireless network) may perform the sequence of instructions required to practice the invention in coordination with one another.

Computer system 900B may transmit and receive messages, data, and instructions, including program, i.e., application code, through communication link 915B and communication interface 914B. Received program code may be executed by processor 907B as it is received, and/or stored in disk drive 910B, or other non-volatile storage for later execution. In an embodiment, the computing system 900B operates in conjunction with a data storage system 931B, e.g., a data storage system 931B that includes a database 932B that is readily accessible by the computing system 900B. The computing system 900B communicates with the data storage system 931B through a data interface 933B. A data interface 933B, which is coupled with the bus 906B, transmits and receives electrical, electromagnetic or optical signals that include data streams representing various types of signal information, e.g., instructions, messages and data. In embodiments of the invention, the functions of the data interface 933B may be performed by the communication interface 914B.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing placement using row templates for an electronic design using row templates, comprising:

identifying, by one or more electronic design automation (EDA) modules stored at least partially in memory and functioning in conjunction with at least one microprocessor of one or more computing systems, a set of legal requirements comprising alignment with multiple reference grids and legal orientations for one or more layout circuit components;

in response to a first input received at a user interface and comprising an area in the user interface for a row region, identifying or creating, by the one or more EDA modules, a row region in an electronic design;

applying, by the one or more EDA modules, a row template to the row region to create a plurality of rows that satisfy the set of legal requirements in the row region;

receiving, at the user interface, a second input for placing a layout circuit component of the one or more layout circuit components at an approximate location in the layout;

in response to second input for placing the layout circuit component, generating, at the one or more EDA modules, a reduced set of rows as placement candidates from the plurality of rows at least by filtering out one or more rows that are incompatible with one or more characteristics of the layout circuit component; and in response to the second input, generating or updating a legal placement layout at least by placing, at the one or more EDA modules, the layout circuit component into at least one row of the reduced set of rows, wherein generating or updating the legal placement layout comprises: positioning the layout circuit component at a legal location in the row region-based at least in part upon the approximate location with at least the row template, without iterating through or repeatedly processing a plurality of placement options before reaching the legal placement layout; and causing manufacturing of a version the legal placement layout by integrated circuit manufacturing equipment with one or more photomasks that are fabricated according to the version of the legal placement layout.

2. The computer implemented method of claim 1, further comprising:

generating a final layout based at least in part upon the legal placement layout and causing semiconductor fabrication equipment to fabricate an electronic circuit using at least the final layout to form the at least the layout circuit component in the at least one row while satisfying the set of legal requirements.

3. The computer implemented method of claim 1, identifying or creating the row region further comprising:

identifying a placement region or a placement or route boundary for the row region;

identifying reference grids; and snapping the row region to the reference grids.

4. The computer implemented method of claim 3, identifying or creating the row region further comprising:

identifying an existing row template for, creating a new row template for, or modifying an reusable row template into the row template for the row region; and identifying a plurality of characteristics specified in the row template for the row region.

5. The computer implemented method of claim 4, identifying or creating the row region further comprising:

determining how to fill the row region when a row region height is greater than a row template height.

6. The computer implemented method of claim 4, identifying or creating the row region further comprising:

determining whether the row region overlaps with another row region in the layout.

7. The computer implemented method of claim 6, identifying or creating the row region further comprising:

creating the plurality of rows to fill the row region by guiding creation of the plurality of rows with the row template;

associating one or more characteristics of the plurality of characteristics with each placement row of the plurality of rows; and storing the plurality of rows as one or more corresponding physical objects or one or more corresponding references in a data structure.

8. The computer implemented method of claim 7, identifying or creating the row region further comprising:

modifying the row region while maintaining at least one characteristic of the plurality of characteristics without regenerating the plurality of rows; and storing the row region as a row region object in the data structure or in a different data structure.

9. The computer implemented method of claim 1, further comprising customizing one or more row region characteristics or one or more row template characteristics, wherein applying the row template to the row region comprises:

determining a number of rows for the row template;

determining a plurality of characteristics for the number of rows;

determining one or more rail characteristics for the number of rows;

determining one or more background layers for the number of rows; and specifying the plurality of characteristics, the one or more rail characteristics, or the one or more background layers in the row template.

10. The computer implemented method of claim 9, applying the row template to the row region comprising:

creating at least one placement row of the plurality of rows in the row region;

associating at least some of the plurality of characteristics, the one or more rail characteristics, or the one or more background layers with the at least one placement row created in the row region; and storing the row template as a logical row template object or a row template reference in a data structure.

11. The computer implemented method of claim 10, applying the row template to the row region comprising:
updating at least one characteristic of the plurality of characteristics for the number of rows.

12. The computer implemented method of claim 1, placing the one or more layout circuit components comprising:
identifying an instance to be placed into the row region and a plurality of instance characteristics of the instance;
invoking a placement command for the instance; and
querying the plurality of rows with the placement command to obtain query results.

13. The computer implemented method of claim 12, placing the one or more layout circuit components comprising:
identifying one or more candidate rows for the instance at least by comparing at least a first instance characteristic of the plurality of instance characteristics to at least a first characteristic of a plurality of characteristics for the row region specified in the row template.

14. The computer implemented method of claim 13, placing the one or more layout circuit components comprising:
identifying one or more candidate legal location for the instance at least by comparing at least a second instance characteristic of the plurality of instance characteristics to at least a second characteristic of the plurality of characteristics for the row region specified in the row template; and
generating a legal placement layout by inserting the instance in a candidate row or at a candidate legal location.

15. A system for implementing placement using row templates for an electronic design using row templates, comprising:
one or more electronic design automation (EDA) modules that are stored at least partially in memory of and functioning in conjunction with at least one microprocessor including one or more processor cores executing one or more threads in one or more computing systems;
a non-transitory computer accessible storage medium storing thereupon program code that includes a sequence of instructions that, when executed by the at least one microprocessor or processor core of a computing system, causes the at least one microprocessor or processor core at least to:
in response to a first input received at a user interface and comprising an area in the user interface for a row region, identify, by one or more EDA modules, stored at least partially in the memory and functioning in conjunction with the at least one microprocessor of the one or more computing systems, a set of legal requirements comprising alignment with multiple reference grids and legal orientations for one or more layout circuit components;
in response to a first input received at a user interface and comprising an area in the user interface for a row region, identify or create, by the one or more EDA modules, a row region in a layout of an electronic design;
apply, by the one or more EDA modules, a row template to the row region to create a plurality of rows that satisfy the set of legal requirements in the row region;
receive, at the user interface, a second input for placing a layout circuit component of the one or more layout circuit components at an approximate location in the layout;

in response to second input for placing the layout circuit component, generate, at the one or more EDA modules, a reduced set of rows as placement candidates from the plurality of rows at least by filtering out one or more rows that are incompatible with one or more characteristics of the layout circuit component; and
in response to the second input, generating or updating a legal placement layout at least by placing, at the one or more EDA modules, the layout circuit component into at least one row of the plurality of rows, wherein generating or updating the legal placement layout comprises: positioning the layout circuit component at a legal location in the row region based at least in part upon the approximate location with at least the row template, without iterating through or repeatedly processing a plurality of placement options before reaching the legal placement layout; and
cause manufacturing of a version the legal placement layout by integrated circuit manufacturing equipment with one or more photomasks that are fabricated according to the version of the legal placement layout.

16. The system of claim 15, wherein the program code includes further instructions that, when executed by the at least one micro-processor or processor core, cause the at least one processor or processor core to:
customize one or more row region characteristics or one or more row template characteristics;
identify a placement region or a placement or route boundary for the row region;
identify reference grids;
snap the row region to the reference grids;
identify an existing row template for, creating a new row template for, or modifying an reusable row template into the row template for the row region;
identify a plurality of characteristics specified in the row template for the row region;
determine how to fill the row region when a row region height is greater than a row template height;
determine whether the row region overlaps with another row region in the layout;
create the plurality of rows to fill the row region by guiding creation of the plurality of rows with the row template;
associate one or more characteristics of the plurality of characteristics with each placement row of the plurality of rows;
store the plurality of rows as one or more corresponding physical objects or one or more corresponding references in a data structure;
modify the row region while maintaining at least one characteristic of the plurality of characteristics without regenerating the plurality of rows; and
store the row region as a row region object in the data structure or in a different data structure.

17. The system of claim 16, wherein the program code includes further instructions that, when executed by the at least one micro-processor or processor core, cause the at least one processor or processor core to:
determine a number of rows for the row template;
determine a plurality of characteristics for the number of rows;
determine one or more rail characteristics for the number of rows;
determine one or more background layers for the number of rows;

specify the plurality of characteristics, the one or more rail characteristics, or the one or more background layers in the row template;

create at least one placement row of the plurality of rows in the row region;

associate at least some of the plurality of characteristics, the one or more rail characteristics, or the one or more background layers with the at least one placement row created in the row region; and store the row template as a logical row template object or a row template reference in a data structure.

18. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for implementing placement using row templates for an electronic design using row templates, the set of acts comprising:

identifying, by one or more electronic design automation (EDA) modules stored at least partially in memory and functioning in conjunction with at least one microprocessor of one or more computing systems, a set of legal requirements comprising alignment with multiple reference grids and legal orientations for one or more layout circuit components;

in response to a first input received at a user interface and comprising an area in the user interface for a row region, identifying or creating, by the one or more EDA modules, a row region in an electronic design;

applying, by the one or more EDA modules, a row template to the row region to create a plurality of rows that satisfy the set of legal requirements in the row region;

receiving, at the user interface, a second input for placing a layout circuit component of the one or more layout circuit components at an approximate location in the layout;

in response to the second input, generating or updating a legal placement layout at least by placing, at the one or more EDA modules, the layout circuit component into at least one row of the plurality of rows based at least in part upon the approximate location with at least the row template, without iterating through or repeatedly processing a plurality of placement options before reaching the legal placement layout; and causing manufacturing of a version the legal placement layout by integrated circuit manufacturing equipment with one or more photomasks that are fabricated according to the version of the legal placement layout.

19. The article of manufacture of claim 18, the set of acts further comprising:

in response to second input for placing the layout circuit component, generating, at the one or more EDA modules, a reduced set of rows as placement candidates from the plurality of rows at least by filtering out one or more rows that are incompatible with one or more characteristics of the layout circuit component, wherein the legal placement layout is generated at least by positioning the layout circuit component at a legal location in the row region based at least in part upon the approximate location; and identifying an instance to be placed into the row region and a plurality of instance characteristics of the instance;

invoking a placement command for the instance; and querying the plurality of rows with the placement command to obtain query results.

20. The article of manufacture of claim 19, the set of acts further comprising:

identifying one or more candidate rows for the instance at least by comparing at least a first instance characteristic of the plurality of instance characteristics to at least a first characteristic of a plurality of characteristics for the row region specified in the row template;

identifying one or more candidate legal location for the instance at least by comparing at least a second instance characteristic of the plurality of instance characteristics to at least a second characteristic of the plurality of characteristics for the row region specified in the row template; and generating a legal placement layout by inserting the instance in a candidate row or at a candidate legal location.

* * * * *